(12) United States Patent
Rosik et al.

(10) Patent No.: US 9,285,818 B2
(45) Date of Patent: Mar. 15, 2016

(54) AUTONOMOUS THERMAL CONTROLLER FOR POWER MANAGEMENT IC

(75) Inventors: Raymond Keith Rosik, San Diego, CA (US); Sandeep Chaman Dhar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 807 days.

(21) Appl. No.: 13/559,030

(22) Filed: Jul. 26, 2012

(65) Prior Publication Data

US 2014/0028377 A1    Jan. 30, 2014

(51) Int. Cl.
*G05F 3/02* (2006.01)
*G06F 1/20* (2006.01)
*G06F 1/32* (2006.01)

(52) U.S. Cl.
CPC ........ *G05F 3/02* (2013.01); *G06F 1/206* (2013.01); *G06F 1/3206* (2013.01)

(58) Field of Classification Search
CPC ...................................................... G06F 1/266
USPC ...................................................... 307/31–35
See application file for complete search history.

(56) References Cited

U.S. PATENT DOCUMENTS

| | | | |
|---|---|---|---|
| 6,393,374 B1 | 5/2002 | Rankin et al. | |
| 6,789,037 B2 | 9/2004 | Gunther et al. | |
| 6,996,491 B2 | 2/2006 | Gold et al. | |
| 7,461,272 B2 | 12/2008 | Rotem et al. | |
| 7,617,403 B2 | 11/2009 | Capps, Jr. et al. | |
| 7,698,583 B2 * | 4/2010 | Gaskins | G06F 1/206 713/300 |
| 2003/0110012 A1 | 6/2003 | Orenstien et al. | |
| 2010/0250974 A1 * | 9/2010 | Ristic et al. | 713/300 |
| 2012/0159216 A1 | 6/2012 | Wells et al. | |
| 2012/0166839 A1 | 6/2012 | Sodhi et al. | |

OTHER PUBLICATIONS

International Search Report and Written Opinion—PCT/US2013/052413—ISA/EPO—Jan. 8, 2014.

* cited by examiner

*Primary Examiner* — Fritz M Fleming
(74) *Attorney, Agent, or Firm* — Chui-kui Teresa Wong; Paul Holdaway

(57) ABSTRACT

Techniques for autonomous thermal management of a power-management integrated circuit (PMIC). In an exemplary embodiment, an embedded microcontroller is provided on the PMIC to store instructions for implementing a thermal controller. The thermal controller may manage in real-time the current scaling factors of a plurality of modules coupled to corresponding off-chip power entities. The thermal controller may include registers that are programmable by an off-chip entity such as a microprocessor to specify parameters such as module priorities and a minimum current scaling factor for each module. Power entities that may be controlled by the autonomous thermal controller include, e.g., a battery charger, and/or one or more user-interface entities such as a back light display driver, a flash LED driver, or an audio amplifier.

13 Claims, 6 Drawing Sheets

AUTONOMOUS THERMAL CONTROLLER FOR POWER MANAGEMENT IC

BACKGROUND

1. Field

The disclosure relates to thermal management for power management integrated circuits (PMIC's).

2. Background

Power management integrated circuits (PMIC's) are circuits specifically designed to manage the power consumption of a system. In particular, a PMIC may process the raw voltage from a power supply, such as a battery, and in turn supply regulated voltages to drive a plurality of off-chip power consumption entities separate from the PMIC. Modern PMIC's are becoming increasingly integrated due to greater system complexity. A typical PMIC may include many high-power on-chip modules for driving off-chip power consumption entities, such as switched-mode battery chargers (SMBC's), back light display drivers (WLED's), buck regulators, audio amplifiers, and flash LED drivers. The on-chip modules may dissipate considerable power when processing power to or from the off-chip entities.

In some system implementations, concurrent use scenarios for the power consumption entities may rapidly drive up the power dissipation of the PMIC, and in turn cause the temperature of the chip to exceed the thermal limits (e.g., 150° C.) of the silicon and the package. For example, in a typical PMIC, maximum power dissipation can be up to 8 Watts if all power consumption entities operate concurrently. On the other hand, to keep the junction (or die) temperature below 125° C., the maximum allowable power dissipation on the die may be closer to 2 Watts, assuming a typical package theta-JA and up to 85° C. ambient temperature.

To manage the PMIC power dissipation and ensure that the junction temperature does not exceed maximum limits, prior art techniques may call for monitoring and software control of the PMIC by a separate entity, e.g., a separate microprocessor coupled to the PMIC through the external pins of the PMIC. It will be appreciated that this approach to thermal management of the PMIC may cause significant latency, as a microprocessor would need to communicate with the PMIC over an interface, and such latency could undesirably result in thermal shutdown of the PMIC for certain concurrent use cases. Alternatively, prior art techniques may include performing coarse temperature monitoring and module control on the PMIC itself. However, such coarse techniques may not provide the flexibility and control of more sophisticated algorithms that may be implemented using a separate microprocessor.

In light of these considerations, it would be desirable to provide improved techniques for thermal management of a PMIC.

SUMMARY

An aspect of the present disclosure provides an apparatus comprising: a plurality of modules, each module configured to process power to or from a corresponding off-chip power entity; a temperature sensor configured to sense a temperature of an integrated circuit on which the plurality of modules is provided; a thermal controller configured to adjust a maximum power processed by each of said plurality of modules in response to the sensed temperature; wherein the thermal controller and the plurality of modules are provided on a single integrated circuit.

Another aspect of the present disclosure provides a method comprising: sensing a temperature of a power management integrated circuit (PMIC) on which a plurality of modules is provided, each module module configured to process power to or from a corresponding power entity off-chip from the PMIC; adjusting a maximum power delivered by each of said plurality of modules in response to the sensed temperature, wherein the adjusting is performed by a thermal controller provided on the PMIC.

Yet another aspect of the present disclosure provides an apparatus comprising: means for processing power to or from at least one corresponding off-chip power entity; means for sensing a temperature of an integrated circuit on which the means for processing power is provided; means for adjusting a power processed by each of said plurality of modules in response to the sensed temperature, wherein the means for adjusting and the means for processing power are provided on a single integrated circuit.

Yet another aspect of the present disclosure provides a computer program product storing code for causing a computer to manage the temperature of an integrated circuit, the code comprising: code for causing a computer to assign priorities to a plurality of modules processing power to or from at least one corresponding off-chip power entity; code for causing a computer to determine the temperature of an integrated circuit on which the plurality of modules is provided; and code for causing a computer to adjust a power processed by each of said plurality of modules in response to the determined temperature; wherein the code for causing the computer to adjust the power is provided in a memory integrated on a single chip with the code for causing a computer to assign priorities.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
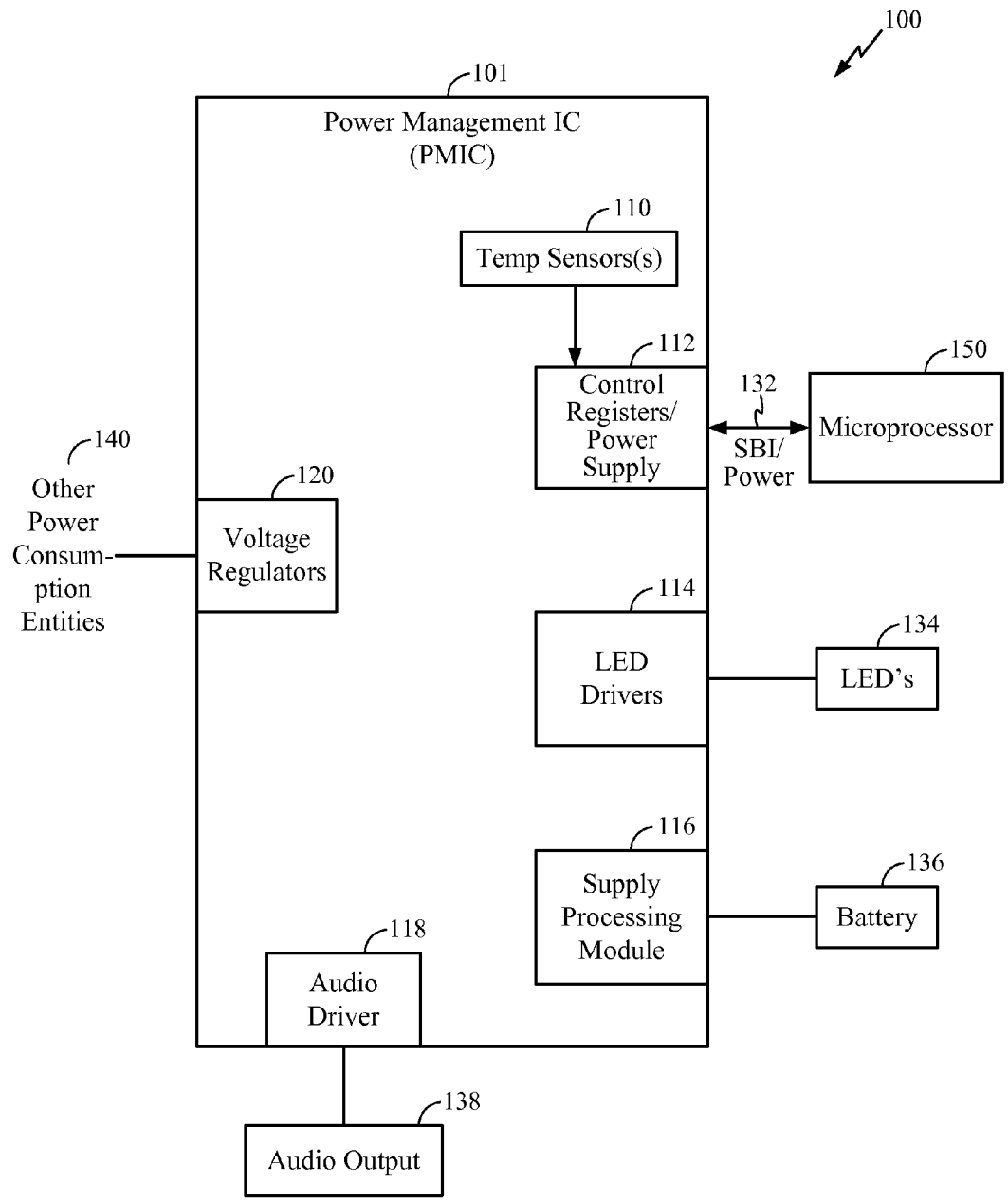
FIG. 1 illustrates an example of a baseline system utilizing a power management integrated circuit (PMIC).

FIG. 1 illustrates an example of a baseline system 100 utilizing a power management integrated circuit (PMIC) 101. Note FIG. 1 is shown for illustrative purposes only, and is not meant to limit the scope of the present disclosure only to systems or entities explicitly shown in FIG. 1. The system 100 may be any electrical system containing entities whose power is managed or processed by modules on the PMIC. These may include, e.g., a power supply entity from which the PMIC receives power, as well as off-chip power consumption entities to which the PMIC delivers power. In this specification and in the claims, unless otherwise noted, a "power entity" denotes both power supply entities and power consumption entities coupled to the PMIC, while an "off-chip power entity" denotes that such power entity is not provided on the same integrated circuit as the PMIC. A "module" denotes a functional block of a PMIC designed to interface with a corresponding power entity coupled to the PMIC. In cases wherein a module is coupled to a power consumption entity, then the module may be configured to source current to the power consumption entity.

In FIG. 1, a PMIC 101 includes a supply processing module 116 coupled to a battery 136, which supplies a raw voltage to the PMIC 101. The PMIC 101 may also receive power from other power sources (not shown), including, e.g., an external charger, an adapter, etc. Using the raw voltage received from the battery 136 or other power source, the PMIC 101 may generate regulated and controlled voltages for powering various power consumption entities off-chip from the PMIC 101. The PMIC 101 may also monitor the voltages provided to the power consumption entities, and may vary the supplied voltages over time depending on, e.g., acceptable operating limits, thermal conditions, etc.

Power consumption entities illustrated in FIG. 1 include a microprocessor 150, LED's 134, an audio output unit 138, and other power consumption entities 140 not explicitly enumerated herein. One of ordinary skill in the art will appreciate that the techniques of the present disclosure may be readily applied to entities not explicitly shown in FIG. 1 or mentioned herein, including, e.g., other user interface entities, digital signal processors, modem circuitry, etc.

In particular, in FIG. 1, LED's 134 are coupled to on-chip LED drivers 114 in PMIC 101. The LED's 134 may include, e.g., back light displays utilizing white LED's, flash LED's, etc. The PMIC 101 further includes an audio driver 118 coupled to control the audio signal power delivered to the audio output unit 138. The audio output unit 138 may include, e.g., speakers, stereo or mono headphones, etc. The PMIC 101 may further include voltage regulators 120 coupled to other power consumption entities 140 requiring supply voltages.

Further coupled to the PMIC 101 is a microprocessor 150. The microprocessor 150 is disposed on a separate integrated circuit from the PMIC 101, and may receive regulated power from the PMIC 101, as well as provide instructions to the PMIC 101 for controlling operation of the PMIC 101. For example, the module 112 on the PMIC 101 may be configured to communicate with the microprocessor 150 using a serial bus interface (SBI). The microprocessor 150 may communicate with the PMIC 101 to manage, in real time, current supplied to the various power entities coupled to the PMIC 101. The module 112 may further supply power to the microprocessor 150.

As earlier described hereinabove, it will be appreciated that certain concurrent system use scenarios for high-power PMIC modules on the PMIC can rapidly drive up power dissipation on the PMIC die, and thus readily cause the PMIC to exceed its thermal limits (e.g., 150° C.). For example, in a typical PMIC, maximum power dissipation can be up to 8 Watts (W) if all high-power modules are used concurrently. However, for typical package theta-JA (defined as the junction-to-ambient thermal resistance), to keep the junction temperature below 125° C. with max 85° C. ambient temperature, the maximum allowable power dissipation should only be approximately 2 Watts.

In light of these considerations, it becomes critical for a PMIC to effectively manage the power dissipation on the die, to prevent the junction temperature from exceeding operating limits. In the system 100 of FIG. 1, temperature sensors 110 are provided on the PMIC 101 to monitor the junction temperature on the die. The temperature sensors 110 are further configured to report the measurements via the microprocessor interface 112 to the microprocessor 150. In the system 100 of FIG. 1, the microprocessor 150 may manage the various modules on the PMIC 101 over the interface 132 in real time, in response to the measurements made by the temperature sensors 110, to ensure that the junction temperature on the PMIC 101 does not exceed operating limits.

Figure 2:
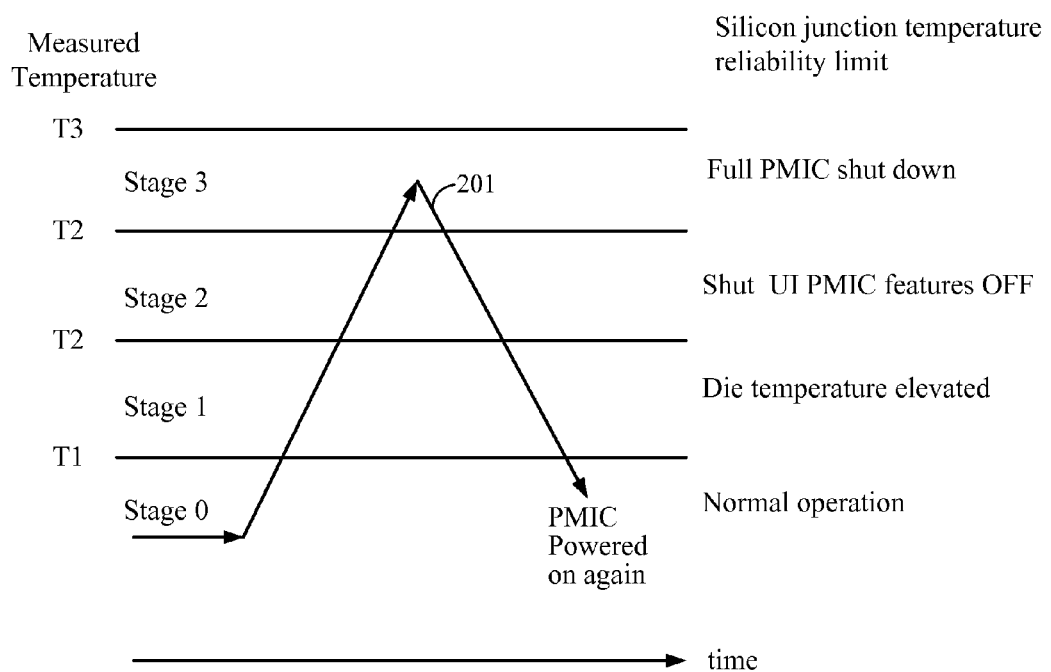
FIG. 2 illustrates a temperature profile of the PMIC, in which the PMIC may coarsely manage the modules on the PMIC to self-protect the PMIC from over-heating.

Alternatively, certain power management devices may include on-chip temperature sensors, and may include self-protection circuitry to coarsely monitor and shut down modules when certain temperature thresholds are exceeded. FIG. 2 illustrates a temperature profile of the PMIC in which the PMIC 101 coarsely manages in real time the modules on the PMIC 101 to self-protect the device. In FIG. 2, an exemplary profile 201 is illustrated depicting a hypothetical variation of the measured temperature versus time. The different stages represent exemplary temperature regimes, in which the PMIC 101 may take different actions to manage the die junction temperature. Note the enumeration of various stages and temperature limits in FIG. 2 are shown for illustrative purposes only, and are not meant to limit the scope of the present disclosure.

In FIG. 2, Stage 0 may correspond to a normal operating temperature range for the PMIC 101, e.g., below temperature T1. Stage 1 may correspond to a condition wherein the junction temperature is elevated, e.g., between T1 and T2. Stage 2 may correspond to a temperature range, e.g., between T2 and T3, PMIC 101 may begin to automatically shut off modules for supplying power to certain user interface (UI) power consumption entities, as such user interface entities may typically consume the most power. For example, in Stage 2, the LED drivers 114 and the audio driver 118 on the PMIC 101 may be instructed to shut off power to the LED's 134 and the audio output 138, respectively, to prevent the junction temperature from further increasing. Other exemplary user interface modules may include back light, Class D amplifiers, and a vibrator motor driver. In certain implementations, automatic hardware control on the PMIC 101 may be programmed to completely shut down high-power user interface modules when the junction temperature exceeds the minimum Stage 2 threshold. Stage 3 may correspond to a temperature range, e.g., between T2 and T3, wherein the PMIC 101 is instructed to fully shut down.

In certain implementations, the temperature sensors 110 may provide an indication of the detected temperature range, e.g., an independent signal indicating the detection of Stage 2 temperatures, etc. Alternatively, the temperature sensors 110 may provide a simple temperature reading, and the microprocessor 150 or PMIC 101 may use the temperature reading to determine the corresponding temperature stage.

Following the trajectory of the exemplary temperature profile 201, it is seen that as the UI features are shut down, the temperature of the PMIC 101 may cool down from Stage 3 back to Stage 0. At Stage 0, the PMIC 101 may be allowed to resume normal operation. Note if the PMIC 101 shuts down in Stage 3, then it may shut down all the regulated supply voltages used by the PMIC 101 and other chips, including the microprocessor 150. To re-activate the PMIC 101 following such a thermal shut-down event, a power-on trigger such as a power button press may be utilized.

Note in the baseline implementation described in FIGS. 1 and 2, the microprocessor 150 may be provided with software instructing the PMIC 101 to adjust the module current settings in response to the detected junction temperatures. Thermal management of the PMIC 101 would thus require close monitoring and software interaction with the microprocessor 150. However, implementing the thermal management features in software generally results in greater latency, as the measured temperature and microprocessor instructions to the PMIC 101 must be communicated back and forth over the interface 132. Furthermore, in certain scenarios wherein the microprocessor 150 is "locked up" due to, e.g., software malfunction, or otherwise has a slow response time, the junction temperature of the PMIC 101 may inadvertently be allowed to rise beyond the acceptable level.

Alternatively, if coarse thermal management shut-down techniques are adopted, as earlier described with reference to FIG. 2, then separate microprocessor control is not required for self-protection of the PMIC. However, it would be desirable to provide finer granularity to thermal management circuitry provided on the PMIC 101 than such coarse techniques, such that more control may be exerted over, e.g., the amount of current received by the PMIC 101 from a power supply, or sourced by the PMIC 101 to power consumption entities, etc. It would be further desirable to have techniques to specify the relative priorities that may be assigned to the modules when reducing their corresponding current in response to elevated temperatures.

According to the present disclosure, techniques are provided for providing an autonomous thermal controller directly integrated with the PMIC. Such an autonomous thermal controller may be provided with diverse functionality, and may directly manage power modules on the PMIC based on the measured junction temperature, thereby reducing the latency associated with communicating thermal management data and instructions with a separate off-chip microprocessor.

Figure 3:
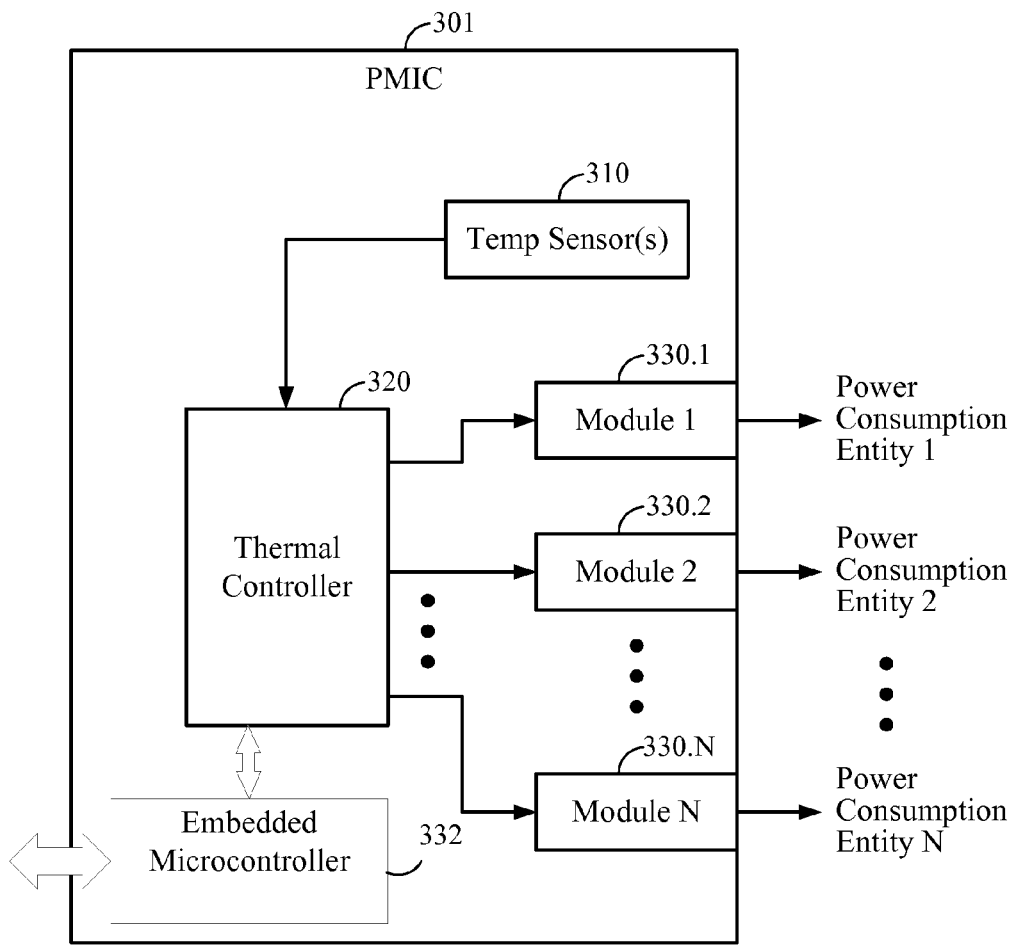
FIG. 3 illustrates an exemplary embodiment of a PMIC according to the present disclosure.

FIG. 3 illustrates an exemplary embodiment of a PMIC 301 according to the present disclosure. In FIG. 3, a thermal controller 320 is integrated with the PMIC 301, i.e., provided on the same integrated circuit die as the rest of the PMIC 301. The thermal controller 320 may also be denoted herein as an "autonomous" thermal controller, as it is integrated with the PMIC 301 and therefore does not require real-time control by an off-chip entity such as the microprocessor 150 of FIG. 1. The thermal controller 320 receives measurements of the junction temperature of the PMIC 301 from temperature sensors 310. Based on the temperature measurements, the thermal controller 320 may exert fine control over the various modules 330.1 through 330.N on the PMIC 301, to process the power delivered by a power source to the PMIC 101, as well as the power delivered to the various off-chip power consumption entities by the PMIC 301.

In an exemplary embodiment, the functionality of the thermal controller 320 may be executed by, e.g., an embedded microcontroller 332 of the PMIC 301. In particular, the embedded microcontroller 332 may be native to the PMIC 301, and software for implementing the functionality of the autonomous thermal controller may be stored on non-volatile memory accessible to the embedded microcontroller 332. In an exemplary embodiment, the embedded microcontroller 332 may be provided with a limited instruction set that can, e.g., execute a series of reads and writes to different registers within the PMIC as part of a predefined sequence that can be stored in one-time-programmable (OTP), non-volatile memory on the PMIC. The embedded microcontroller 332 communicates with thermal controller 320 and also communicates with memories or other devices external to the PMIC 301.

In certain exemplary embodiments, the microcontroller may also function as a programmable boot sequencer (PBS), which may be designed to allow the device to be programmed to perform different operations in sequence during power-up (e.g., turning on regulators in a predefined order, or doing SBI register writes to pre-configure the PMIC without direction from the microprocessor upon boot up, etc.).

Figure 4:
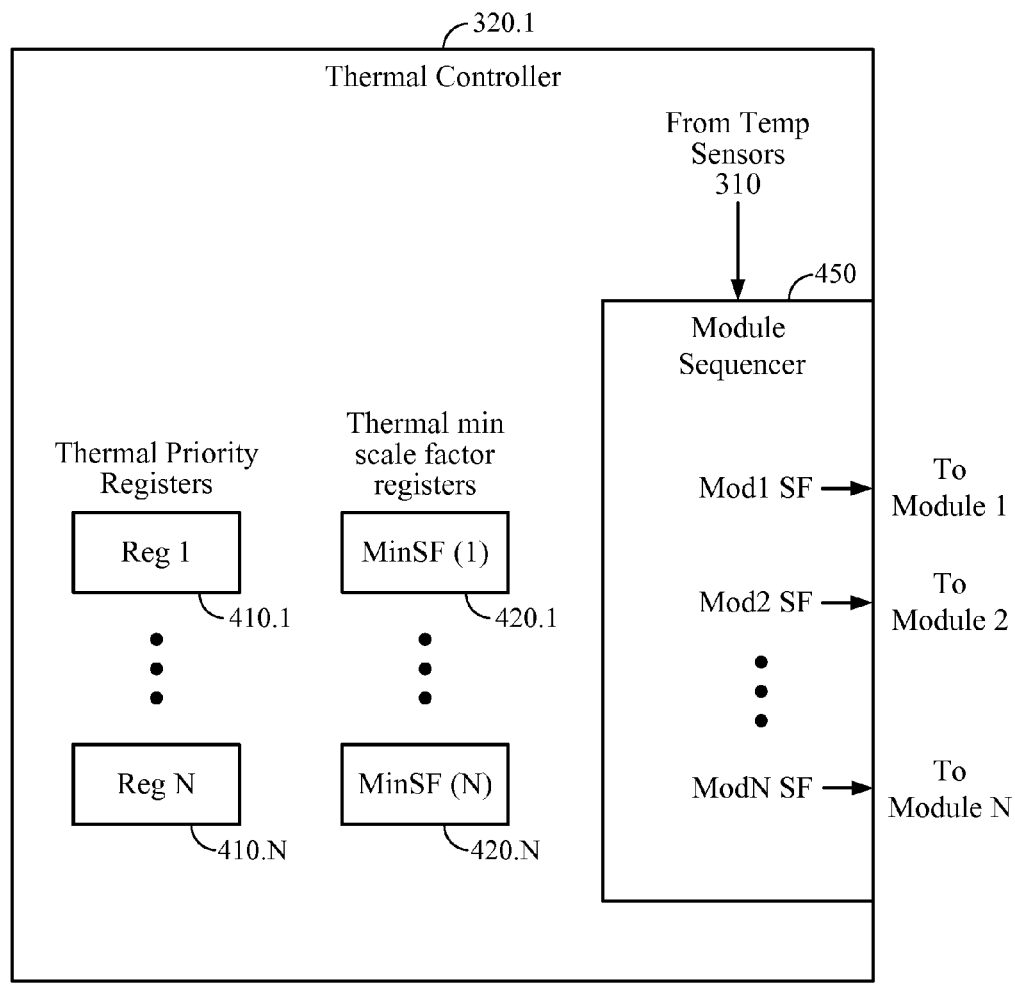
FIG. 4 illustrates an exemplary embodiment of a thermal controller according to the present disclosure.

FIG. 4 illustrates an exemplary embodiment 320.1 of a thermal controller 320 according to the present disclosure. Note the exemplary embodiment 320.1 is shown for illustrative purposes only, and is not meant to limit the scope of the present disclosure to autonomous thermal controllers necessarily having the specific functionality disclosed in FIG. 4.

As earlier described hereinabove, due to concurrent activation of high power modules during specific usage cases, the junction temperature may exceed a first predetermined temperature threshold. A thermal sequencer 450 within the thermal controller 320.1 may be activated when the temperature exceeds the first threshold. The thermal sequencer 450, or "sequencer" (as distinguished herein from "programmable boot sequencer"), may sequentially scale down currents processed by the plurality of modules in response to the temperature exceeding the predetermined threshold.

In an exemplary embodiment, a programmable priority assignment may determine the order in which current reduction is performed across the modules. For example, current received or sourced by a first higher-priority module may be reduced prior to current received or sourced by a second lower-priority module being reduced, etc. In this specification and in the claims, the term "high-priority" may denote that a module's current should be reduced first in sequence, prior to reducing other "lower-priority" modules' currents.

In an exemplary embodiment, the thermal controller may include a plurality of thermal priority registers 410.1 through 410.N. Each priority register stores a programmable priority value assigned to a corresponding module. In this manner, the thermal controller may be programmed to specify the order according to which the modules' currents are to be reduced. For example, modules corresponding to the highest power consumption entities, such as a switched-mode battery charger (SMBC), may be assigned a highest priority using the thermal priority registers, and conversely, modules corresponding to entities causing lower power dissipation, such as the flash LED, WLED, and audio amplifier, may be assigned successively lower priorities. In an exemplary embodiment, the priority assignments are programmable so that they can be set, e.g., using software from a microprocessor 150, based on user requirements. Alternatively, they may be hard-coded into NV memory.

In an exemplary embodiment, the thermal controller may also include a bank of minimum scaling factor (SF) registers 420.1 through 420.N. In an exemplary embodiment, each SF register may be programmed with a minimum scaling factor (minSF) corresponding to each module. The SF registers may set the minimum current that the sequencer will reduce each module to during a thermal event before moving on to reducing the current scaling factor of the next priority module. For example, the minimum scaling factor for charging current to the battery provided by the SMBC module could be set to scale a full 2-Amp default current down to no less than 500 mA, after which the thermal controller 320.1 should proceed to reduce the current sourced by the next lower priority module, as specified by the thermal priority registers 410.

In an exemplary embodiment, once the junction temperature drops below a second threshold, which may correspond to an acceptable temperature range for normal operation of the PMIC, the sequencer may stop reducing the module currents, and latch in the appropriate current scaling factors to registers (not shown) in the thermal controller.

Note in this specification and in the claims, the current scaling factor, or alternatively, "maximum" current scaling factor, may be a measure of the maximum amount of current that is processed by (e.g., received from or sourced by) a module on the PMIC corresponding to an off-chip power entity. It is contemplated that the techniques of the present disclosure are also applicable to controlling power consumption parameters other than the current scaling factor of each module. For example, any or all of the entities' average current consumption, average power consumption, peak-to-average power consumption, amplifier gain (in the case of the audio amplifier), switching frequency of a regulator in a module (e.g., corresponding to the SMPS, SMBC, or backlight WLED driver), etc., may be monitored, adjusted, and/or controlled according to the techniques of the present disclosure.

Figure 5:
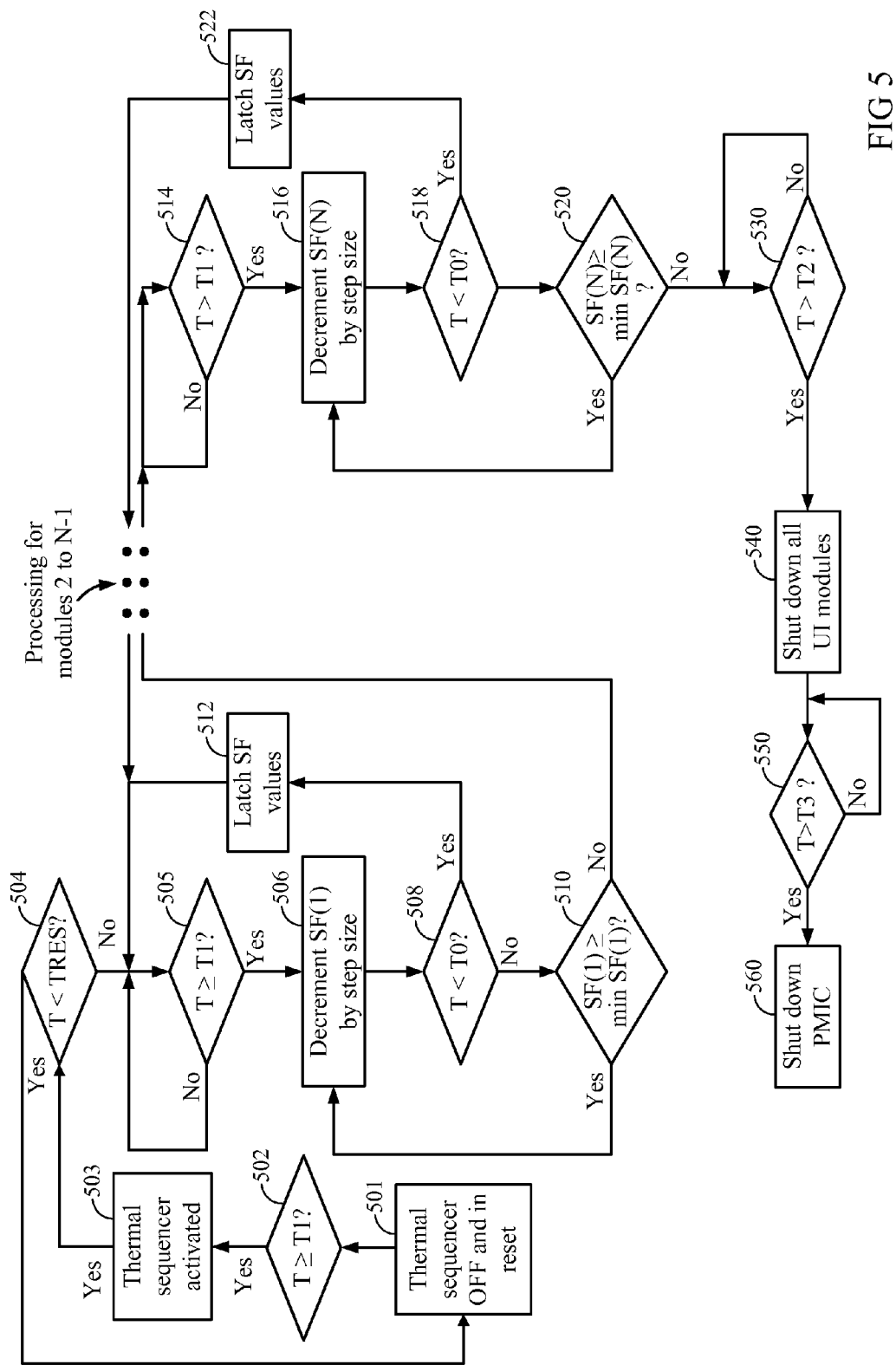
FIG. 5 illustrates an exemplary instance of operations performed by the thermal sequencer upon activation.

FIG. 5 illustrates an exemplary instance of operations that may be performed by the thermal sequencer upon activation. Note FIG. 5 is shown for illustrative purposes only, and is not meant to limit the scope of the present disclosure to any particular thermal sequencer scheme shown. Modifications to the scheme shown in FIG. 5 may readily be made by one of ordinary skill in the art in light of the principles disclosed herein, and such alternative exemplary embodiments are contemplated to be within the scope of the present disclosure.

In FIG. 5, at block 501, the thermal sequencer is off, and in a reset state. Note in the reset state, all stored scaling factor (SF) values may be set according to predetermined default values, e.g., values corresponding to full-scale current for all power entities.

At block 502, it is checked whether the temperature T is greater than or equal to T1. If yes, then the operation proceeds to block 503. If no, then the operation may continue checking at block 502.

At block 503, the thermal sequencer is activated, and it is checked whether the temperature T is less than TRES, at block 504. If yes, then it may be determined that the thermal sequencer need not be activated, and thus operation returns to block 501. If no, then operation proceeds to block 505.

It will be appreciated that if the temperature drops below the reset threshold TRES, then all the latched SF values may be restored to their original default values. In this manner, if the device temperature returns to the ambient temperature, or to any temperature significantly below a T0 threshold by, e.g., 10° or 20° C., the modules can be automatically returned to their full performance capabilities. The thermal controller would then be disabled along with the reset until, e.g., another thermal event pushes the die junction temperature above T1 again. In an exemplary embodiment, TRES may be less than T0.

At block 505, it is checked whether the temperature (T) is above the threshold T1. If no, the thermal sequencer continues checking. If yes, the thermal sequencer proceeds to block 506.

At block 506, the current scaling factor for a first module SF(1) may be decremented by a step size. In an exemplary embodiment, the step size may be predetermined and set to a fixed value, or the step size may be programmable via software control.

At block 508, it is checked whether the temperature (T) is lower than a threshold T0 lower than T1. If yes, the thermal sequencer may continue to block 512. If no, the sequencer may continue to block 510. It will be appreciated that the threshold T0 may be chosen to correspond to the upper range of a normal operating temperature range, wherein if T<T0, then no further current scaling factor reduction needs to be performed. Therefore, if T<T0, then at block 512, the thermal sequencer latches in the existing current scaling factor values, e.g., to a plurality of registers in the thermal controller for subsequent use.

At block 510, it is checked whether SF(1) is greater than or equal to a minimum scaling factor for the first module minSF (1). If yes, the sequencer returns to block 506. If no, the sequencer proceeds to processing for the next module, e.g., module 2 (the processing of which is not explicitly shown in FIG. 5). It will be appreciated the minimum scaling factor for a given module may be chosen to correspond to the minimum level to which the current scaling factor may be reduced. In an exemplary embodiment, once SF(1) is reduced to minSF(1), then the sequencer will not reduce SF(1) any further at that time, and will instead move on to reducing the current scaling factor for a next module (e.g., cycling through SF(n), wherein n is an index from 1 to N denoting all the modules of the PMIC) if the temperature remains elevated. In an exemplary embodiment, the ordering of the modules 1 to N may be as prescribed by the registers 410.1 through 410.N as described with reference to FIG. 4.

In an exemplary embodiment, processing for all modules n from 1 to N may proceed analogously to what is described with reference to module 1, e.g., analogous blocks to blocks 504 through 510 for module 1 may be provided for all modules n from 1 to N. In FIG. 5, the processing for modules 2 through N−1 is not illustrated for simplicity, and is instead represented by ellipses between blocks 510 and 514, as well as ellipses between blocks 522 and 504.

It will be appreciated that module-specific parameters may be provided for all module-specific processing blocks, e.g., each module may have a different associated scaling factor SF(n) as well as a different minimum scaling factor minSF (n). In an exemplary embodiment, these values may be set by programming the registers 410 and 420 as earlier described hereinabove with reference to FIG. 4.

Blocks 514 through 520 represent the processing for module N, corresponding to the lowest-priority module, e.g., as specified using priority registers 410.1 through 410.N in FIG. 4.

Following block 520, if SF(N) is not greater than or equal to minSF(N), then the sequencer proceeds to block 530. At block 530, it is checked whether T is greater than a threshold temperature T2 greater than T1. If no, then the sequencer continues checking. If yes, then the sequencer proceeds to block 540, at which a self-protection scheme may be applied wherein modules of the PMIC are selectively shut down. It will be appreciated that the temperature T being greater than T2 may indicate that the temperature is increasing despite the actions taken by the thermal controller to reduce the module current scaling factors, in which case the self-protection scheme may need to be undertaken.

At block 540, all user-interface (UI) modules are shut down, and the sequencer proceeds to block 550.

At block 550, it is checked whether T is greater than a threshold temperature T3 greater than T2. If no, then the sequencer continues checking. If yes, then the entire PMIC may be shut down at block 560. Note if the entire PMIC is shut down by the thermal controller for self-protection, it may need to receive a power-on trigger, e.g., from a power button or charger insertion, to be re-activated.

It is contemplated that, in light of the present disclosure, one of ordinary skill in the art may readily derive alternative thermal sequencer schemes for reducing the PMIC temperature other than that shown in FIG. 5. For example, alternative exemplary embodiments of thermal sequencers may or may not incorporate hysteresis, and/or alternative module prioritization schemes (e.g., wherein the scaling factors for all modules are simultaneously reduced in lockstep, with each module having a different step size), fewer or more temperature thresholds than shown, etc. Furthermore, various temperature checks not explicitly shown in FIG. 5 may be performed in alternative exemplary embodiments. For example, in alternative exemplary embodiments, the temperature check at block 504 need not be performed. Such alternative exemplary embodiments are contemplated to be within the scope of the present disclosure.

Figure 6:
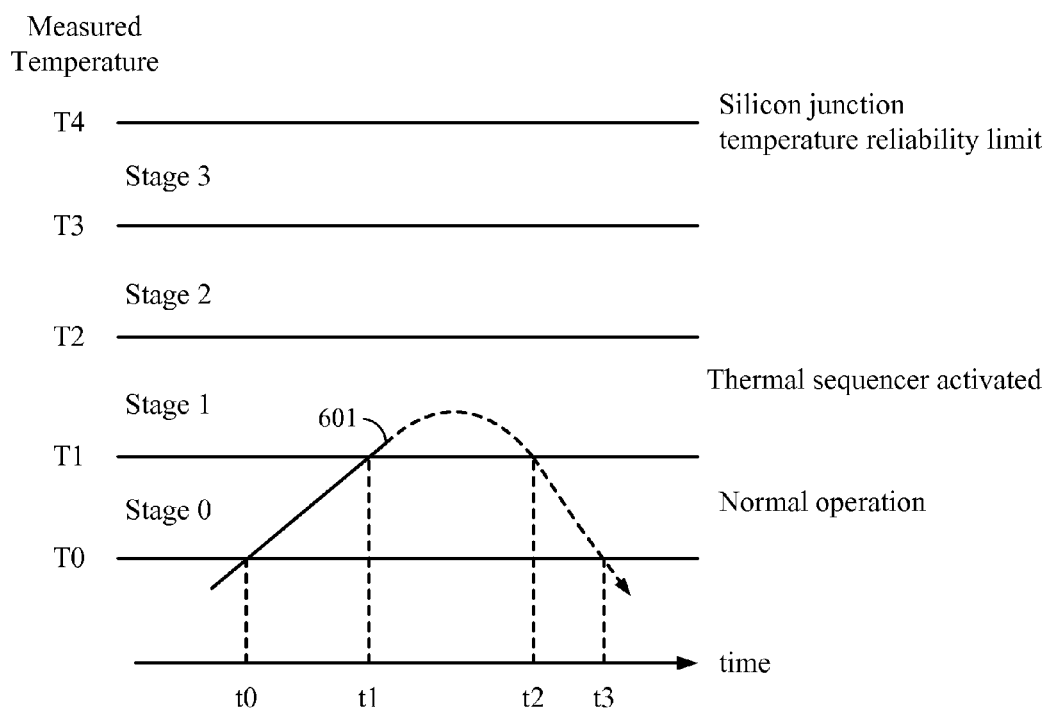
FIG. 6 illustrates an exemplary temperature profile of the PMIC resulting from thermal management by the autonomous controller described herein.

FIG. 6 illustrates an exemplary temperature profile of the PMIC resulting from thermal management by the autonomous controller 320.1. Note the temperature variables T0, T1, etc., need not correspond to the same variables as described earlier herein with reference to FIG. 2. In FIG. 6, an exemplary profile 601 is illustrated depicting a hypothetical variation of PMIC temperature versus time. From time t0 to t1, the measured temperature is seen to increase from T0 to T1. At time t1, when the measured temperature exceeds the first threshold T1, the thermal sequencer is activated. In an exemplary embodiment, the thermal sequencer may perform operations as described hereinabove with reference to FIG. 5.

Following activation of the thermal sequencer at time t1, the rate of temperature change is seen to decrease between times t1 to t3 due to actions performed by the thermal sequencer, e.g., as described hereinabove with reference to FIG. 5. At time t2, the temperature is seen to return to below T1, while at time t3, the temperature returns to below T0. In an exemplary embodiment, the temperature reduction schemes applied by the thermal sequencer may incorporate hysteresis, e.g., current scaling factors of modules may be reduced once the temperature exceeds T1, and may continue to be reduced as long as the temperature remains above T0 which is lower than T1.

In light of the present disclosure, one of ordinary skill in the art will appreciate that any of the techniques described above may be practiced independently or in conjunction with each other, and with other techniques not explicitly mentioned herein. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, VLSI Library elements, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus comprising:
   a plurality of modules, each module configured to process power to or from a corresponding off-chip power entity;
   a temperature sensor configured to sense a temperature of an integrated circuit on which the plurality of modules is provided; and
   a thermal controller configured to adjust a power processed by each of said plurality of modules in response to the sensed temperature; wherein the thermal controller and the plurality of modules are provided on a single integrated circuit; and further wherein the thermal controller is configured to adjust a current scaling factor of each module to adjust said power processed by each of said plurality of modules.

2. The apparatus of claim 1, wherein the thermal controller is configured to reduce the current scaling factor of at least one module in response to the sensed temperature being above a threshold.

3. The apparatus of claim 2, wherein the thermal controller is configured to reduce the current scaling factor of each module to no less than a minimum current scaling factor.

4. The apparatus of claim 3, wherein the thermal controller is configured to, in response to the current scaling factor of all modules being reduced to the minimum current scaling factor, further shut down all modules corresponding to user interface power consumption entities in response to the sensed temperature being above a second threshold greater than the first threshold.

5. The apparatus of claim 4, wherein the thermal controller is configured to further shut down all power entities in response to the sensed temperature being above a third threshold greater than the second threshold.

6. An apparatus comprising:
   a plurality of modules, each module configured to process power to or from a corresponding off-chip power entity;
   a temperature sensor configured to sense a temperature of an integrated circuit on which the plurality of modules is provided; and
   a thermal controller configured to adjust a power processed by each of said plurality of modules in response to the sensed temperature; wherein the thermal controller and the plurality of modules are provided on a single integrated circuit; and further wherein the thermal controller is configured to reduce current scaling factors of the plurality of modules in succession in response to the sensed temperature being above a first threshold, the succession being determined by a plurality of scaling priority registers.

7. An apparatus comprising:
   a plurality of modules, each module configured to process power to or from a corresponding off-chip power entity;
   a temperature sensor configured to sense a temperature of an integrated circuit on which the plurality of modules is provided; and
   a thermal controller configured to adjust a power processed by each of said plurality of modules in response to the sensed temperature; wherein the thermal controller and the plurality of modules are provided on a single integrated circuit; and further wherein the thermal controller is configured to reduce current scaling factors of the plurality of modules in parallel in response to the sensed temperature being above a first threshold.

8. An apparatus comprising:
   a plurality of modules, each module configured to process power to or from a corresponding off-chip power entity;
   a temperature sensor configured to sense a temperature of an integrated circuit on which the plurality of modules is provided; and
   a thermal controller configured to adjust a power processed by each of said plurality of modules in response to the sensed temperature; wherein the thermal controller and the plurality of modules are provided on a single integrated circuit; and further wherein the thermal controller is configured to adjust an amplifier gain of a module to adjust an audio signal power processed by said module.

9. A method comprising:
   sensing a temperature of a power management integrated circuit (PMIC) on which a plurality of modules is provided, each module configured to process power to or from a corresponding power entity off-chip from the PMIC; and
   adjusting a power processed by each of said plurality of modules in response to the sensed temperature, wherein the adjusting is performed by a thermal controller provided on the PMIC and further wherein the adjusting the power comprising adjusting a current scaling factor of each module to adjust said power processed by each of said plurality of modules.

10. The method of claim 9, the adjusting the current scaling factor comprising reducing the current scaling factor of at least one module in response to the sensed temperature being above a threshold.

11. The method of claim 10, the adjusting the current scaling factor further comprising reducing the current scaling factor of each module to no less than a minimum current scaling factor.

12. The method of claim 11, further comprising, in response to the current scaling factor of all modules being reduced to the minimum current scaling factor, shutting down all modules corresponding to user interface power consumption entities in response to the sensed temperature being above a second threshold greater than the first threshold.

13. A computer program product storing code for causing a computer to manage the temperature of an integrated circuit, the code comprising:
   code for causing a computer to assign priorities to a plurality of modules processing power to or from at least one corresponding off-chip power entity;
   code for causing a computer to determine the temperature of an integrated circuit on which the plurality of modules is provided; and
   code for causing a computer to adjust a power processed by each of said plurality of modules in response to the determined temperature, wherein the code for causing the computer to adjust the power provided in a memory integrated on a single chip with the code for causing a computer to assign priorities; and code for causing a computer to assign minimum current scaling factors to each of said plurality of modules.

* * * * *